(12) United States Patent
Bock et al.

(10) Patent No.: US 9,941,768 B2
(45) Date of Patent: Apr. 10, 2018

(54) ELECTRIC DRIVE, VEHICLE HAVING AN ELECTRIC DRIVE, AND METHOD FOR OPERATING AN ELECTRIC DRIVE

(71) Applicant: Bayerische Motoren Werke Aktiengesellschaft, Munich (DE)

(72) Inventors: Thomas Bock, Oberhaching (DE); Karl-Heinz Gaubatz, Parsdorf (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 0 days.

(21) Appl. No.: 14/460,710

(22) Filed: Aug. 15, 2014

(65) Prior Publication Data

US 2014/0353062 A1    Dec. 4, 2014

Related U.S. Application Data

(63) Continuation of application No. PCT/EP2012/074237, filed on Dec. 3, 2012.

(30) Foreign Application Priority Data

Feb. 17, 2012    (DE) .................. 10 2012 202 432

(51) Int. Cl.
| | |
|---|---|
| *H02K 7/00* | (2006.01) |
| *B60K 1/02* | (2006.01) |
| *B60K 17/04* | (2006.01) |
| *B60K 17/06* | (2006.01) |
| *B62K 11/00* | (2006.01) |

(Continued)

(52) U.S. Cl.
CPC .............. *H02K 7/003* (2013.01); *B60K 1/02* (2013.01); *B60K 17/04* (2013.01); *B60K 17/06* (2013.01); *B62K 11/00* (2013.01); *H02K 9/00* (2013.01); *H02K 16/00* (2013.01); *H02P 5/00* (2013.01); *B60K 2001/006* (2013.01); *B60K 2001/0405* (2013.01); *B60Y 2200/12* (2013.01);

(Continued)

(58) Field of Classification Search
CPC .......... B60K 17/04; B60K 1/02; H02K 7/003; H02K 9/00; H02K 16/00; H02K 2209/00; H02P 5/00; H62K 11/00; B62K 2204/00
USPC .......................................... 180/220; 307/9.1
See application file for complete search history.

(56) References Cited

U.S. PATENT DOCUMENTS 5,242,028 A * 9/1993 Murphy ................... B62M 6/55
                                                                180/206.4
5,253,724 A    10/1993 Prior
(Continued)

FOREIGN PATENT DOCUMENTS

| CN | 1226496 A | 8/1999 |
| CN | 1572645 A | 2/2005 |

(Continued)

OTHER PUBLICATIONS

International Search Report dated Jul. 31, 2013 (Three (3) pages).

(Continued)

*Primary Examiner* — Jacob D Knutson
(74) *Attorney, Agent, or Firm* — Crowell & Moring LLP

(57) ABSTRACT

An electric drive, particularly for vehicles, includes at least one first and at least one second electric machine. The electric machines are arranged relative to one another in a manner comparable to the cylinders of a conventional opposed-cylinder internal-combustion engine.

20 Claims, 2 Drawing Sheets

(51) Int. Cl.
  H02K 9/00 (2006.01)
  H02K 16/00 (2006.01)
  H02P 5/00 (2016.01)
  B60K 1/00 (2006.01)
  B60K 1/04 (2006.01)
(52) U.S. Cl.
  CPC ..... *B60Y 2200/126* (2013.01); *B62K 2204/00* (2013.01); *H02K 2209/00* (2013.01)

(56) References Cited

U.S. PATENT DOCUMENTS

| | | | | |
|---|---|---|---|---|
| 5,865,267 | A * | 2/1999 | Mayer | B62M 6/60 180/206.5 |
| 5,901,807 | A * | 5/1999 | Tseng | B62M 6/55 180/206.3 |
| 6,516,911 | B1 * | 2/2003 | Mayer | B62M 6/65 180/206.2 |
| 7,243,937 | B2 * | 7/2007 | Ishikawa | 280/288.4 |
| 7,249,644 | B2 | 7/2007 | Honda et al. | |
| 8,145,410 | B2 | 3/2012 | Berger et al. | |
| 8,517,126 | B2 | 8/2013 | Atarashi | |
| 2005/0067207 | A1 * | 3/2005 | Radtke | B62M 6/45 180/223 |
| 2008/0227365 | A1 * | 9/2008 | Lo | A63H 17/21 446/440 |
| 2011/0018373 | A1 * | 1/2011 | Tian | H02K 5/18 310/61 |
| 2011/0304288 | A1 * | 12/2011 | Saida | 318/376 |
| 2013/0234505 | A1 * | 9/2013 | Matsuda | B60K 1/02 307/9.1 |

FOREIGN PATENT DOCUMENTS

| | | | |
|---|---|---|---|
| CN | 1847692 A | 10/2006 | |
| CN | 201089520 Y | 7/2008 | |
| DE | 10 2010 025 457 A1 | 1/2011 | |
| EP | 0 937 600 A2 | 8/1999 | |
| EP | 0937600 A2 * | 8/1999 | |
| EP | 0937600 A2 * | 8/1999 | ............. B60K 6/365 |
| WO | WO 2011/108403 A1 | 9/2011 | |
| WO | WO 2012/059962 A1 | 5/2012 | |
| WO | WO 2012059962 A1 * | 5/2012 | ............... B60K 1/02 |
| WO | WO2112059962 A1 * | 5/2012 | |

OTHER PUBLICATIONS

Chinese Office Action issued in Chinese counterpart application No. 201280065332.7 dated Jan. 12, 2016, with English translation (Twenty Three (23) pages).

German Office Action issued in German counterpart application No. 10 2012 202 432.8 dated Oct. 13, 2016 (Two (2) pages).

* cited by examiner

US 9,941,768 B2

ELECTRIC DRIVE, VEHICLE HAVING AN ELECTRIC DRIVE, AND METHOD FOR OPERATING AN ELECTRIC DRIVE

CROSS REFERENCE TO RELATED APPLICATIONS

This application is a continuation of PCT International Application No. PCT/EP2012/074237, filed Dec. 3, 2012, which claims priority under 35 U.S.C. § 119 from German Patent Application No. 10 2012 202 432.8, filed Feb. 17, 2012, the entire disclosures of which are herein expressly incorporated by reference.

BACKGROUND AND SUMMARY OF THE INVENTION

The present invention relates to an electric drive, particularly for vehicles, having at least one first and at least one second electric machine, and to a vehicle having such an electric drive, as well as to a method for operating the electric drive.

Currently, several million two-wheel vehicles with an electric drive are already being sold worldwide. Originating from bicycles with an electric drive, electric drives are increasingly also introduced in the field of scooters or "motorbikes".

It is an object of the invention to create an electric drive that is particularly suitable for use in the motorbike field.

This and other objects are achieved by an electric drive, particularly for vehicles, having at least one first and at least one second electric machine. The electric machines are arranged relative to one another in a manner comparable with the cylinders of an opposed-cylinder internal-combustion engine.

Other objects, advantages and novel features of the present invention will become apparent from the following detailed description of one or more preferred embodiments when considered in conjunction with the accompanying drawings.

DETAILED DESCRIPTION OF DRAWINGS

Figure 1:
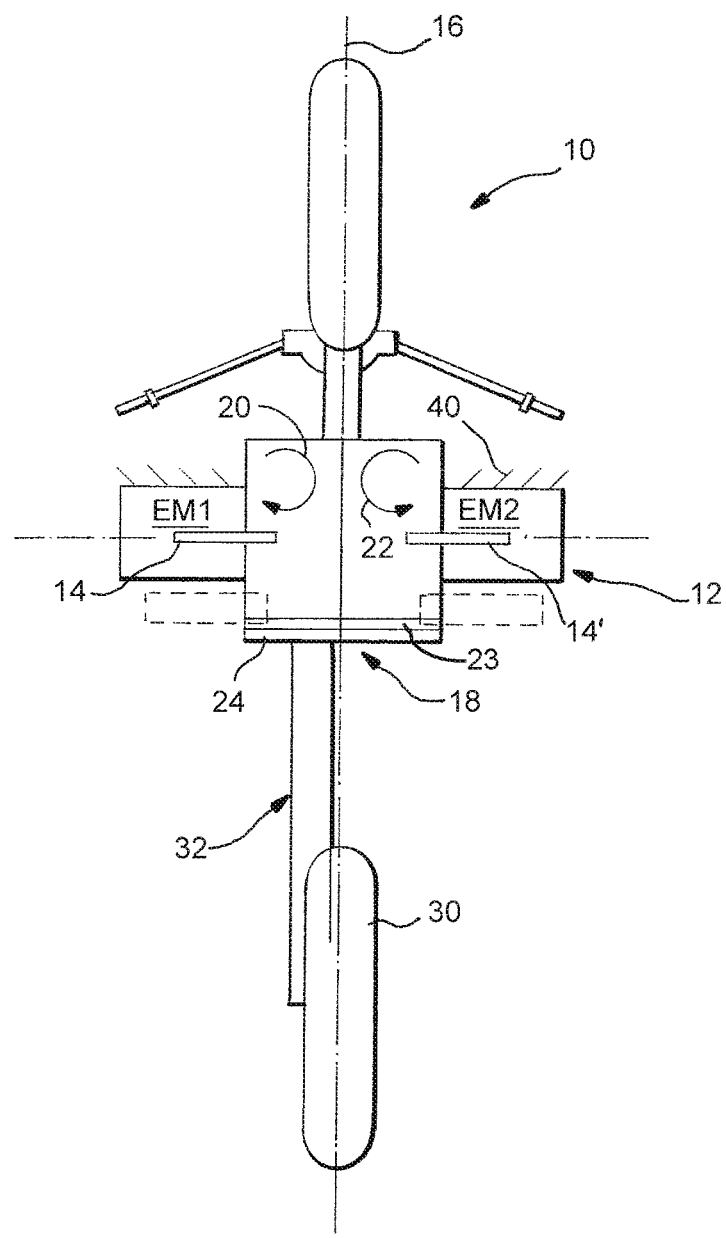
FIG. 1 is a high level top view schematic diagram of a two-wheel vehicle according to an embodiment of the present invention.
Figure 2:
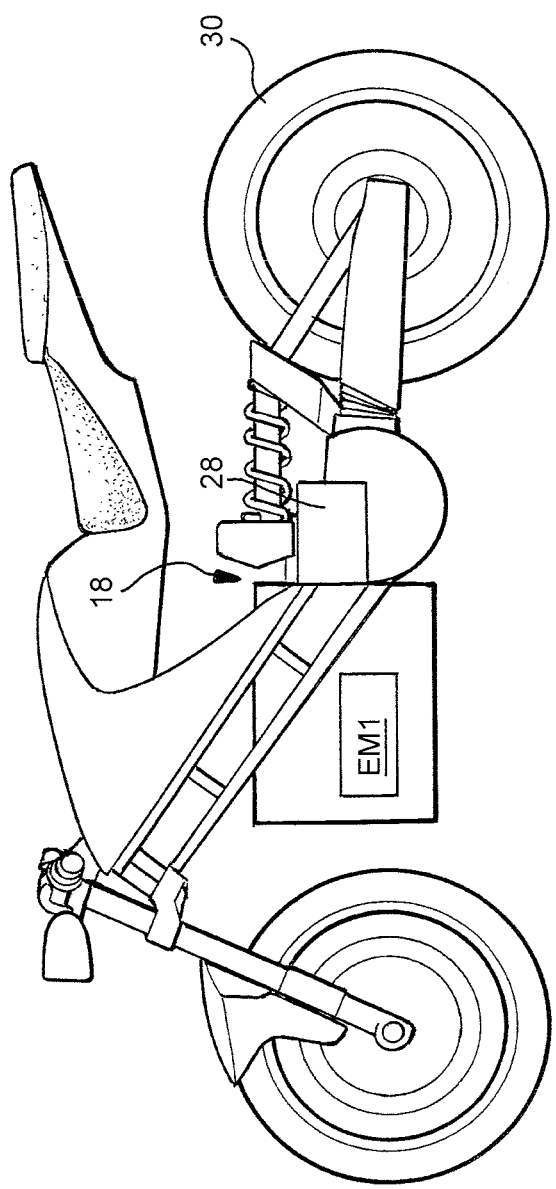
FIG. 2 is a high level schematic side view diagram of a two-wheel vehicle according to the embodiment of the present invention.

Referring to the Figures, an "electric-drive arrangement" 12 is provided with an even number of electric machines (for example, with two electric machines EM1, EM2). The arrangement of the electric machines EM1, EM2 relative to one another follows the concept of the cylinder arrangement of an opposed-cylinder internal-combustion engine (electric opposed cylinder motor). This means that the electric machines are essentially "arranged in a horizontal plane", i.e. in a flat position. The rotor shafts 14, 14' of the electric machines are preferably essentially or exactly perpendicular with respect to a longitudinal center plane 16 of the drive arrangement or of the electric drive, in which case one electric machine EM1 is arranged on one side of the longitudinal center plane 16 and a second electric machine EM2 is arranged on the opposite side of the longitudinal center plane. The at least two electric machines project laterally from the electric drive, comparable to the cylinders of an opposed-cylinder internal-combustion engine.

The electric machines are preferably arranged such that the rotor shafts 14, 14' of a pair of electric machines are coaxial with respect to one another. The two electric machines may essentially be constructed and arranged mirror-symmetrically with respect to the longitudinal center plane. However, the electric machines are not arranged directly on one another but are arranged in a mutually "spaced" manner in the longitudinal direction of their rotor shafts, which will be explained in detail in the following.

Such an electric drive may have a transmission arrangement 18 having a first and a second drive element 20, 22 as well as an output element 24. The term "transmission arrangement" should be interpreted extremely broadly in this context. In a very general sense, what is meant is an "arrangement" that makes it possible to:

a) transmit torque from the first electric machine to the output element, b) from the second electric machine to the output element, and/or c) simultaneously from both electric machines to the output element.

On one side of the transmission arrangement, the at least one first electric machine EM1 is arranged which, in a torque-transmitting manner can be coupled or is coupled with the first drive element 20. On a second side of the transmission arrangement situated opposite the first side, the at least one second electric machine EM2 is arranged, which can be coupled or is coupled in a torque-transmitting manner with the second drive element 22.

Such an "electric opposed-cylinder motor" which, in its design, is similar to the design of an opposed-cylinder internal-combustion engine, as it is known, for example, from BMW motorcycles, has numerous advantages. In the case of an installation into a two-wheel vehicle 10, because of the spatial arrangement of the electric machines, a comparatively low center of gravity of the vehicle is obtained, which has a very favorable effect on the drivability.

The electric machines projecting laterally on the left and the right, similarly to the case of BMW motorcycles having an opposed-cylinder engine, are situated in front of the driver's feet or shins. The driver's feet or shins are thereby significantly better protected against injuries in the event of a possible accident than in the case of motorcycles with conventional motors that are not opposed-cylinder motors.

An electric energy accumulator 28, which supplies the electric machines with current, may be arranged, for example, below or above the transmission arrangement. In particular, the transmission arrangement may be flanged directly to a housing of the electric energy accumulator.

According to a further development of the invention, the transmission arrangement provided between the two electric machines is configured such that, in operating states, in which the electric machines situated on both sides are driving simultaneously, the two drive elements rotate in mutually opposed directions (clockwise and counter clockwise arrows in FIG. 1). This has the advantage that, during cornering, the gyrostatic torques caused by the two electric drives partly or completely cancel one another.

It may be provided that at least one of the two electric drives provided on both sides of the transmission arrangement is coupled, or can be coupled, by way of a freewheeling mechanism 23, with the assigned drive element of the transmission arrangement. This has the advantage that, depending on the power demand, the driving can take place by means of the electric drive arranged on the left side or by means of the electric drive arranged on the right side, or simultaneously by means of both electric drives.

It is explicitly pointed out that several electric machines, for example, two electric machines, respectively, may be arranged on the first and/or the second side of the transmission arrangement, for example, two electric machines, respectively (shown by dashed lines in FIG. 1). It may be provided that the electric machines provided on one side of the transmission arrangement are each mechanically coupled with one another by way of a coupling device, for example, by way of belt and chain drives, together with the assigned first or second drive element.

The power transmission from the transmission arrangement or from the drive element of the transmission arrangement to a driving wheel 30 of the vehicle 10 may take place, for example, by way of a mechanical transmission, a belt and chain drive, such as a chain drive or belt drive, by way of a cardan drive or by way of other torque transmission devices (generally shown by arrow 32).

With respect to the cooling of the electric machines, it may be provided that the latter are connected to a liquid cooling circuit. The heat released by the electric machines will then be supplied by way of a liquid coolant to a radiator, through which air is flowing, and is released by the radiator into the ambient air.

As an alternative or in addition, the electric machines may be thermally connected with cooling fins 40. Similar to the case of conventional opposed-cylinder internal-combustion engines, the cooling fins may be arranged on the outside at the laterally projecting housing of the electric machines.

The cooling fins are preferably arranged in the longitudinal direction of the electric drive, i.e. perpendicular to the axes of rotation of the electric machines or parallel to the above-mentioned longitudinal center plane, so that, in the case of an installation in a two-wheel vehicle, the air flow can sweep along the cooling fins.

According to a further development of the invention, it is provided that the first drive element is coupled by way of a first transmission ratio with the output element, and the second drive element is coupled by way of a second transmission ratio differing from the first transmission ratio, with the output element. The first and/or the second transmission ratio can, in each case, be formed by a shiftable transmission device or by a fixed non-shiftable transmission device.

Different transmission ratios have the advantage that the electric machine or machines arranged on one side can be used in a first operating range (rotational-speed/torque range), and the electric machine or machines arranged on the other side can be used in another operating range (rotational-speed/torque range). In this manner, the electric drive can be operated over a wide operating range in a favorable efficiency range.

It may be provided that individual or all of the provided electric machines are operating in a "low-voltage range", which means that the maximal operating voltage is lower than a specified operating voltage of, for example 60 V. "Low-voltage drives" have the advantage that the technical expenditures required for operational safety and the training expenditures for servicing personnel are significantly less than in the case of "high-voltage drives".

As an alternative, it may be provided that individual or all electric machines are operated in a high-voltage range, which means that the maximal operating voltage at which the electric machines operate, is above a specified voltage limit of, for example, 60 V.

It may further be provided that the maximal power of each of the electric machines is lower than a specified power of, for example, 25 kW or 20 kW. Electric machines, which do not exceed a power of 20 or 25 kW, have a clearly higher efficiency than higher-power machines. The power of the entire electric drive can be arbitrarily scaled or be scaled according to the demand by the use of several electric machines of this type.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electric drive for a driver ridden motorcycle, comprising:
   a transmission comprising a first drive element, a second drive element and an output element;
   a first electric machine arranged on a first side of the transmission, the first electric machine coupleable in a torque-transmitting manner with the first drive element, and
   a second electric machine arranged on a second side of the transmission opposite the first side, the second electric machine coupleable in a torque-transmitting manner with the second drive element,
   wherein the electric drive is the sole drive for the vehicle, and
   wherein the output element is configured to be driven by the first electric machine and second electric machine individually or in combination such that the driver ridden motorcycle is drivable by each of: the first electric machine, the second electric machine, or both simultaneously, wherein the first and second electric machines project from the transmission on mutually opposite sides of the transmission.

2. The electric drive according to claim 1, wherein the transmission is configured such that the first and second drive elements rotate in mutually opposite directions for providing a torque transmission driving the output element of the transmission.

3. The electric drive according to claim 1, wherein the first and second electric machines each have a motor shaft, the first and second electric machines being arranged such that the respective motor shafts are essentially coaxial relative to one another.

4. The electric drive according to claim 1, wherein at least one of the first and second electric machines is coupleable via a freewheeling mechanism with a corresponding at least one of the first drive element and the second drive element.

5. The electric drive according to claim 1, wherein on the first and second sides of the transmission, at least two electric machines are arranged, the two electric machines on the respective side being coupled with one another and with the assigned drive element via a coupling device.

6. The electric drive according to claim 5, wherein the coupling device is a belt or chain drive.

7. The electric drive according to claim 1, further comprising: cooling fins assigned to each of the first and second electric machines in order to air-cool each of the first and second electric machines, wherein the cooling fins are arranged in the longitudinal direction of the electric drive, perpendicular to the axes of rotation of the electric machines.

8. The electric drive according to claim 1, wherein the first drive element is coupled by way of a first transmission ratio with the output element, and further wherein the second drive element is coupled by way of a second transmission ratio, different from the first transmission ratio, with the output element.

9. The electric drive according to claim 1, wherein at least one of the first and second electric machines operates with an operating voltage that is less than or equal to 60 V.

10. The electric drive according to claim 1, wherein at least one of the first and second electric machines operates with a maximal operating voltage that is greater than 60 V.

11. The electric drive according to claim 1, wherein a maximal power of each of the first and second electric machines is less than 25 kW.

12. The electric drive according to claim 1, further comprising an electric energy accumulator arranged below the transmission.

13. The electric drive according to claim 1, wherein the first electric machine and the second electric machine are disposed on the motorcycle forward of a driver's feet or shins.

14. The electric drive according to claim 1, wherein on the first or the second side of the transmission, at least two electric machines are arranged, the two electric machines being coupled with one another and with the assigned drive element via a coupling device.

15. A driver ridden motorcycle, comprising:
an electric drive comprising a transmission comprising a first drive element, a second drive element, and an output element;
a first electric machine arranged on a first side of the transmission, the first electric machine coupleable in a torque-transmitting manner with the first drive element, and
a second electric machine arrange on a second side of the transmission opposite the first side, the second electric machine coupleable in a torque-transmitting manner with the second drive,
wherein the electric drive is the sole drive for the vehicle, and
wherein the output element is configured to be driven by the first electric machine and second electric machine are individually or in combination such that the driver ridden motorcycle is drivable by each of: the first electric machine, the second electric machine, or both simultaneously, wherein the first and second electric machines project from the transmission on mutually opposite sides of the transmission.

16. The motorcycle according to claim 15, wherein the motorcycle is a two-wheel motorcycle.

17. The motorcycle according to claim 16, wherein the electric drive is installed in the two-wheel motorcycle such that the first and second electric machines project respectively from left and right sides of the two-wheel motorcycle with respect to a longitudinal center plane.

18. The vehicle according to claim 15, wherein the first electric machine and the second electric machine are disposed on the motorcycle forward of a driver's feet or shins.

19. An electric drive for a driver ridden motorcycle, comprising:
a transmission comprising a first drive element, a second drive element and an output element;
a first electric machine arranged on a first side of the transmission, the first electric machine coupleable in a torque-transmitting manner with the first drive element; and
a second electric machine arranged on a second side of the transmission opposite the first side, the second electric machine coupleable in a torque-transmitting manner with the second drive element,
wherein the transmission is configured such that the first and second drive elements rotate in mutually opposite directions for providing a torque transmission driving the output element of the transmission,
wherein the electric drive is the sole drive for the vehicle, and
wherein the output element is configured to be driven by the first electric machine and the second electric machine individually or in combination such that the driver ridden motorcycle is drivable by each of: the first electric machine, the second electric machine, or both simultaneously, wherein the first and second electric machines project from the transmission on mutually opposite sides of the transmission.

20. The electric drive according to claim 19, wherein the first electric machine and the second electric machine are disposed on the vehicle forward of a driver's feet or shins.

* * * * *